United States Patent [19]
Studtmann et al.

[11] 3,815,008
[45] June 4, 1974

[54] CONTROL CIRCUIT FOR REGULATING A DC-TO-DC CONVERTER

[75] Inventors: George H. Studtmann, Mount Prospect; John K. Overzet, Bellwood, both of Ill.

[73] Assignee: Borg-Warner Corporation, Chicago, Ill.

[22] Filed: Mar. 1, 1973

[21] Appl. No.: 337,053

[52] U.S. Cl. ............................................. 321/44
[51] Int. Cl. ............................................. H02m 7/52
[58] Field of Search ............................... 321/43, 44

[56] References Cited
UNITED STATES PATENTS

| | | | |
|---|---|---|---|
| 3,273,045 | 9/1966 | Benson | 321/43 |
| 3,413,538 | 11/1968 | Hodges et al. | 321/18 X |
| 3,452,266 | 6/1969 | Borden et al. | 321/43 X |
| 3,559,028 | 1/1971 | Studtmann et al. | 321/43 X |
| 3,559,029 | 1/1971 | Yarema | 321/43 X |
| 3,593,103 | 7/1971 | Chandler et al. | 321/18 X |

*Primary Examiner*—William M. Shoop, Jr.
*Attorney, Agent, or Firm*—James J. Jennings

[57] ABSTRACT

A first control system includes a chopper (dc-to-dc converter) for passing part of an input voltage $V_i$ through a filter to provide an output voltage $V_o$ for energizing an inverter. A controller regulates the operation of the semiconductor switch in the chopper by providing an output signal which is a function both of a first input signal derived from the input circuit that supplies the input voltage $V_i$ to the chopper, and of a second input signal derived from a reference member. In a second system the reference voltage input to the controller is replaced by an error voltage provided by a comparator. The comparator receives both the reference voltage signal and a second signal related to the output voltage $V_o$ of the chopper-filter combination.

10 Claims, 10 Drawing Figures

CONTROL CIRCUIT FOR REGULATING A DC-TO-DC CONVERTER

BACKGROUND OF THE INVENTION

In the d-c power supply art use is frequently made of a chopper, or dc-to-dc converter, which is energized by an input bus voltage $V_i$ to provide an output voltage $V_o$ which is some fraction of the input voltage $V_i$. By controlling a switch in the chopper circuit, a circuit is completed periodically between the input and output portions of the chopper so that a portion of the input voltage $V_i$, related to the fraction of the time that the switch is closed compared to the total period of operation of the chopper, is supplied as the output voltage $V_o$. A filter, including a series-connected inductor and a parallel-connected capacitor, is generally coupled between the chopper and the load to reduce the ripple or amplitude fluctuations in the output d-c voltage. Considerable effort has been expended in the design and implementation of chopper circuits to provide optimum operating conditions with minimum size of components and expense. For example, it is desirable to have a broad output voltage range for a given input voltage, and it is also a practical consideration to avoid operating the switch in the chopper at too high a frequency to avoid overheating of the semiconductor switch. One method for implementing such a dc-to-dc conversion system which achieves effective operation while minimizing the size of the filter inductor is disclosed and claimed in U. S. Pat. No. 3,559,028 which issued to George H. Studtmann and Raymond J. Yarema on Jan. 26, 1971 and is assigned to the Assignee of this application. At the same time U.S. Pat. No. 3,559,029, assigned to the same Assignee, issued in the name of Raymond J. Yarema. This latter patent describes and claims a control circuit for implementing the method teachings set out in the companion U.S. Pat. No. 3,559,028. These teachings represent a significant step forward in this art, in that the physical size and the expense of the filter inductor represent an appreciable part of the total system space and cost.

Even with this improved system, it is still desirable to provide a precise regulation of the output voltage $V_o$ in spite of fluctuations in the input voltage $V_i$. If the control circuit (or controller) which regulates the chopper is set for a given duty cycle, it will turn the switch on and pass the input voltage through the chopper to the filter if a sudden transient on the d-c input line increases the input voltage $V_i$ by a substantial amount. This operation can result not only in loss of regulation of the output voltage $V_o$, but also can saturate the inductor or choke in the filter, leading to high peak currents and probable failure of the converter.

It is therefore a primary consideration of the present invention to provide a controller for a d-c chopper-filter arrangement which maintains a virtually constant output voltage $V_o$ and obviates saturation of the choke, notwithstanding transient fluctuations of the input voltage $V_i$ supplied to the chopper circuit.

SUMMARY OF THE INVENTION

The present invention is useful in a dc-to-dc conversion system which includes a chopper circuit having at least one semiconductor switch. "Semiconductor switch," as used herein and in the appended claims, refers generally to a semiconductor device such as a transistor, silicon controlled rectifier (SCR), Triac, or other controllable unit which may be variable continually over a given range as well as variable in an on-off mode. Electron-discharge devices can be substituted for the semiconductor units, but such devices are generally not as efficient and require more space. The conversion system further comprises an input circuit for receiving an input voltage $V_i$ which is subject to transient fluctuations, and this input voltage is applied to the chopper circuit. An output circuit is also provided to pass an output voltage $V_o$ to a load. A filter circuit, including an inductor coupled in series between the chopper circuit and the output circuit, is also provided. A controller is connected to apply control signals to the chopper circuit to regulate the conduction times of the semiconductor switch.

In accordance with a first aspect of this invention, means is provided for applying to the controller a first input signal which is a function of the chopper input voltage. Additional means is provided for applying to the controller a second input signal which is a function of a reference voltage. The controller operates, in response to these two input signals, to apply a suitable control signal to the chopper circuit such that saturation of the filter inductor is prevented and the chopper output voltage is maintained substantially constant, in spite of transient fluctuations of the input voltage $V_i$ applied to the chopper circuit.

In accordance with another aspect of the invention, the total system can include a comparator coupled between the controller and the means which supplies the reference voltage. The comparator is connected both to receive the signal which is a function of the reference voltage, and also to receive a second signal proportional to the output voltage $V_o$ supplied by the chopper-filter combination. The comparator output signal, which is an error signal proportional to the algebraic sum of the reference signal and output voltage signal, is utilized as a second input signal to the controller in this feedback arrangement.

THE DRAWINGS

In the several figures of the drawings, like reference numerals identify like components, and in the drawings.

DETAILED DESCRIPTION OF THE INVENTION

Figure 1:
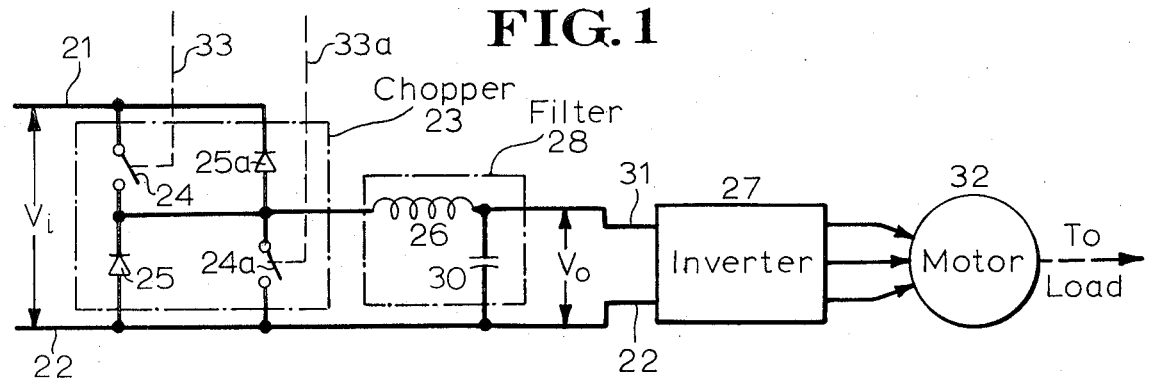
FIG. 1 is a schematic diagram, partly in block form.

In the system shown generally in FIG. 1, a d-c energizing voltage referenced $V_i$ is applied over an input circuit including bus conductors 21, 22 to a chopper circuit 23. For ease of explanation the semiconductor devices are represented by mechanical switches 24 and 24a. Switch 24 is coupled in series with a diode 25 between conductors 21, 22, and switch 24a is coupled in series with a diode 25a between the same conductors. The common connections between the switches and diodes is coupled to one end of an inductor 26 in filter 28. The other side of inductor 26 is coupled over conductor 31 to the load, shown as an inverter 27, and is also coupled through capacitor 30 of the filter to conductor 22.

The chopper or dc-to-dc converter 23 may be either a one-way chopper, capable of passing energy in one direction only, or it may be a bilateral chopper, capable of passing energy in either direction. The one-way chopper would be implemented with the switch 24 and diode 25. The two-way chopper would be implemented by the addition of switch 24a and diode 25a. In the operation of the one-way chopper, the switch 24 is closed and opened periodically. The closure of the switch results in passage of a current through inductor 26, the parallel-connected capacitor 30 and load 27. Upon opening of the switch 24 some of the energy stored in inductor 26 is delivered to capacitor 30 and the connected load. Inductor 26 and capacitor 30 act as a filter to smooth out the pulsating input power pulses and thus produce a steady d-c voltage at the output conductors 31 and 22.

The inherent voltage regulation of the one-way chopper is poor at light loads but becomes quite good once the load and duty cycle are such as to provide continuous conduction of current in the inductor 26. The average output voltage under these conditions is essentially (neglecting IR drops) the input voltage $V_i$ times the duty cycle of switch 24. The one-way chopper shown is thus capable of providing a controlled output voltage $V_o$ of reduced magnitude from that of the input source.

The addition of switch 24a and diode 25a allows the chopper to be bilateral in its operation. Switches 24 and 23a operate in a complementary manner. That is, when one switch opens, the other switch closes. With this arrangement the voltage across the input to the LC filter 28 is either equal to the input bus voltage $V_i$, or is zero. The average of this voltage is essentially equal to the output voltage $V_o$ and is again equal to the input voltage times the duty cycle. However, this average is now independent of the load condition, and from no load to full load the output voltage is essentially equal to the input voltage $V_i$ times the duty cycle (neglecting IR drops).

That the energy may flow in either direction may be seen by two separate analyses. The first is identical to that of the one-way chopper and results in energy flow from the high voltage source $V_i$ to the low voltage source $V_o$. The flow of energy in the opposite direction may be appreciated by assuming that switch 24a closes, resulting in the storing of energy in inductor 26. Opening of switch 25a results in some of the energy stored in inductor 26 being delivered to the conductor 21 by the inductive "kick." Thus energy is in a sense made to flow "up hill" from the low voltage source $V_o$ to the high voltage source $V_i$. The output voltage $V_o$, which is the average voltage provided by chopper 23 and filtered by unit 28, appears between conductors 31 and 22 to energize inverter 27. The inverter is shown supplying electrical energy to a motor 32, which in turn can supply mechanical energy to any suitable load.

Control signals are passed over a circuit represented by broken lines 33 and 33a to regulate the conduction and non-conduction (or on and off) times of the semiconductor switches 24 and 24a in chopper circuit 23.

Figure 2:
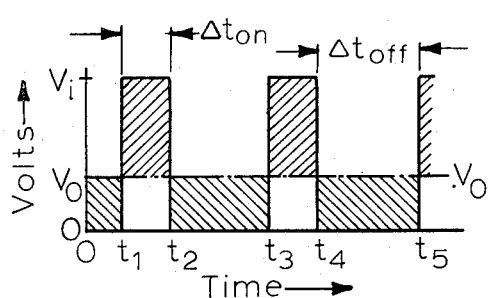
FIGS. 2 and 3 are graphical illustrations, useful in understanding general chopper operation.
Figure 3:
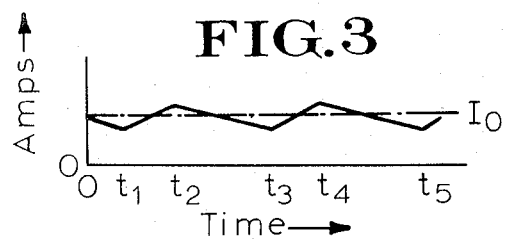

In describing the operation of chopper circuit 23, the explanation will be for such a circuit when acting as a one-way chopper (switch 24 and diode 25) in continuous conduction for passing energy from $V_i$ to $V_o$. When switch 24 is closed, the full input voltage $V_i$ is applied to the filter 28 and the instantaneous voltage across diode 25 rises to the level $V_i$ as shown at time $t_1$ in FIG. 2. At time $t_2$, the switch 24 is opened and the voltage across diode 25 falls to zero as shown. This condition remains during the off time, until $t_3$, when switch 24 is again closed and the voltage rises to $V_i$. The time interval between $t_1$ and $t_2$ during which switch 24 is closed is labeled the on time, or $\Delta t_{on}$, in FIG. 2. The off time is referenced $\Delta t_{off}$. At the output side of the filter 28 the average $V_o$ will be at the level shown in FIG. 2. The shaded area shown in FIG. 2 represents the volt-time integral of the energy applied to inductor 26. It is apparent that if a sudden input transient on the bus conductors 21, 22 were to raise $V_i$ considerably, and if this condition were not corrected during the $\Delta t_{on}$ time, the choke could be saturated and the output voltage $V_o$ would rise considerably. FIG. 3 represents generally how the inductor current varies during the on and off times of the chopper 23. If choke 26 becomes saturated, excessive currents can be drawn, and, if switch 24 is an SCR (for example), there may be failure to commutate.

The foregoing simplified explanation appplies to a two-way chopper, or to a one-way chopper in the continuous conduction mode. The subsequent explanations also obtain for a bilateral chopper, or for a one-way chopper in the continuous conduction mode. The simplified explanation above shows that the average output voltage $V_o$ is proportional to $V_i \Delta t_{on}/\Delta t_{on} + \Delta t_{off}$. Thus the output voltage is a direct function of the input voltage and will be subject to fluctuations as the input voltage varies without some compensation for this condition.

Figure 4:
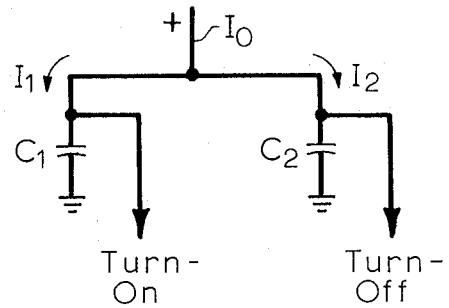
FIG. 4 is a simplified illustration useful in understanding the controller of the above-identified patents.

Known controllers generally employ a basic timing circuit to supply the control signals over line 33 to requlate the operation of the semiconductor switch 24. FIG. 4 represents a simplified controller timing circuit of the type shown in the issued U.S. Pat. No. 3,559,028 and 3,559,029 referred to above. In brief a constant current circuit (not shown) is connected to supply a single current $I_o$ which is divided into the two currents, $I_1$ and $I_2$, to charge the identical capacitors $C_1$ and $C_2$. Interlocking circuits (not shown here) are provided so that only one capacitor is charged at a time. The time required to charge the first capacitor $C_1$ to the firing voltage (of an associated unijunction switch) determines the on time, $\Delta t_{on}$, and the time required to charge the other capacitor $C_2$ to that level determines the off time, $\Delta t_{off}$. This timing arrangement is shown generally in FIG. 16, and schematically in FIGS. 14 and 15, of the two referenced patents. The sum of the currents $I_1$ and $I_2$ is held constant by the action of the cross biased difference amplifier, and capacitors 120 and 156 in FIG. 15 are the two timing capacitors $C_1$ and $C_2$. The complete explanation of such a basic timing circuit is set out in those patents.

A significant part of the present invention resides in the analytical procedure initially followed to determine what is required both to maintain constant the volt-time-integral applied to the inductor, and to maintain constant the output voltage $V_o$. For the controller of the type shown in FIG. 4 and explained in the patents already identified, the two charging currents are equal to the constant current $I_o$. That is:

$$I_1 + I_2 = I_o \qquad (1)$$

In addition, the on time of the switch which transfers the input voltage to the inductor, referred to as $\Delta t_{on}$ in FIG. 2 of this application, is proportional to the capacitor $C_1$, and the firing voltage, and is inversely proportional to the charging current $I_1$. That is:

$$\Delta t_{on} = C_1 V_f / I_1 \qquad (2)$$

Likewise the off time of the chopper can be written as:

$$\Delta T_{off} = C_2 V_f / I_2 \qquad (3)$$

Because the capacitors are identical, each of them can be represented by C. Then the preceding equations can be combined to write:

$$I_o = V_f C \left[ (1/\Delta t_{on}) + (1/\Delta t_{off}) \right] \qquad (4)$$

For the chopper of FIG. 1 it is apparent that the output voltage $V_o$ is:

$$V_o = V_i (\Delta t_{on}/\Delta t_{on} + \Delta t_{off}) \qquad (5)$$

and the expression for the volt-time integral is:

$$\int_{t_{on}}^{t_{off}} e_c dt = V_0 \cdot \Delta t_{off} \qquad (6)$$

To maintain the volt-time integral constant at some value K, equation (6) can be rewritten:

$$V_o \cdot \Delta t_{off} = K \qquad (7)$$

Also, equation (3) above can be rewritten as:

$$I_z \cdot \Delta t_{off} = C V_f \qquad (8)$$

Now combining equations (7) and (8):

$$I_z = C V_f V_o / K \qquad (9)$$

Equation (9) gives the significant inforamtion that to maintain the volt-time integral constant, the current $I_2$ (which determines the off time for the switch in the chopper) must be directly proportional to the output voltage $V_o$ supplied by the chopper-filter combination. This is the first of two important criteria which must be satisfied, to prevent saturation of the choke, and to maintain the output voltage $V_o$ virtually constant. It can be shown that for the case of a oneway chopper in discontinuous conduction, the volt-time integral of the choke will be less than the prescribed constant value which is in the conservative direction.

To develop the other basic requisite for these conditions, equations (4) and (5) above can be rewritten in the following form as equations (10) and (11):

$$I_o/V_f C = \Delta t_{on} + \Delta t_{off}/\Delta t_{on} \cdot \Delta t_{off} \qquad (10)$$

$$V_o/V_i = \Delta t_{on}/\Delta t_{on} + \Delta t_{off} \qquad (11)$$

Equations (10) and (11) can now be rewritten as:

$$I_o/V_f C = V_i/V_o \cdot \Delta t_{off} \qquad (12)$$

Now using equation (7) in conjunction with equation (12):

$$I_o = V_i (V_f C/K) \qquad (13)$$

Equation (13) sets out the second basic criterion to satisfy the conditions noted above. Specifically, the current $I_o$ must be proportional to the input bus voltage $V_i$. With these two basic criteria, the requisite controller and overall system can be developed.

Figure 5:
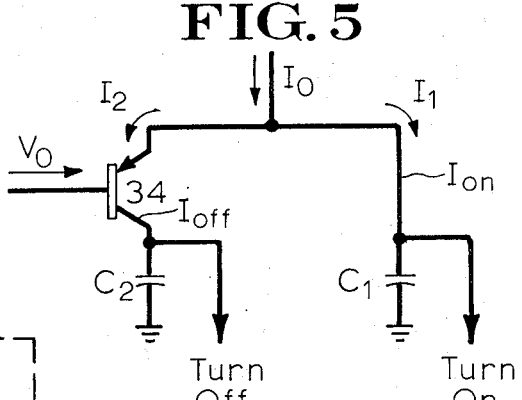
FIG. 5 is a simplified diagram of a controller useful with this invention.

FIG. 5 depicts the simplified arrangement of a controller which satisfies the criteria of equations 9 and 13, thus avoiding saturation of the choke and maintaining the output voltage $V_o$ constant in spite of fluctuation in the input voltage $V_i$ which is applied to the chopper. Equation 9 shows that the current $I_2$ which regulates the off time for the switch in the chopper must be directly proportional to the output voltage $V_o$. This is done by inserting a transistor 34 as shown between the conductor which supplies the current $I_2$ and the timing capacitor $C_2$ which is charged to provide the turn-off signal. The base of transistor 34 is controlled by a signal proportional to the output voltage $V_o$.

The other criterion, set out in equation 13, is that the current $I_o$ must be proportional to the bus voltage $V_i$, which is the same as the chopper input voltage. This is readily done by coupling the conductor in FIG. 5 over which $I_o$ is received to the input bus itself. These two connections, to satisfy the requirements of equations 9 and 13, will be explained in more detail in connection with FIG. 6.

Figure 6:
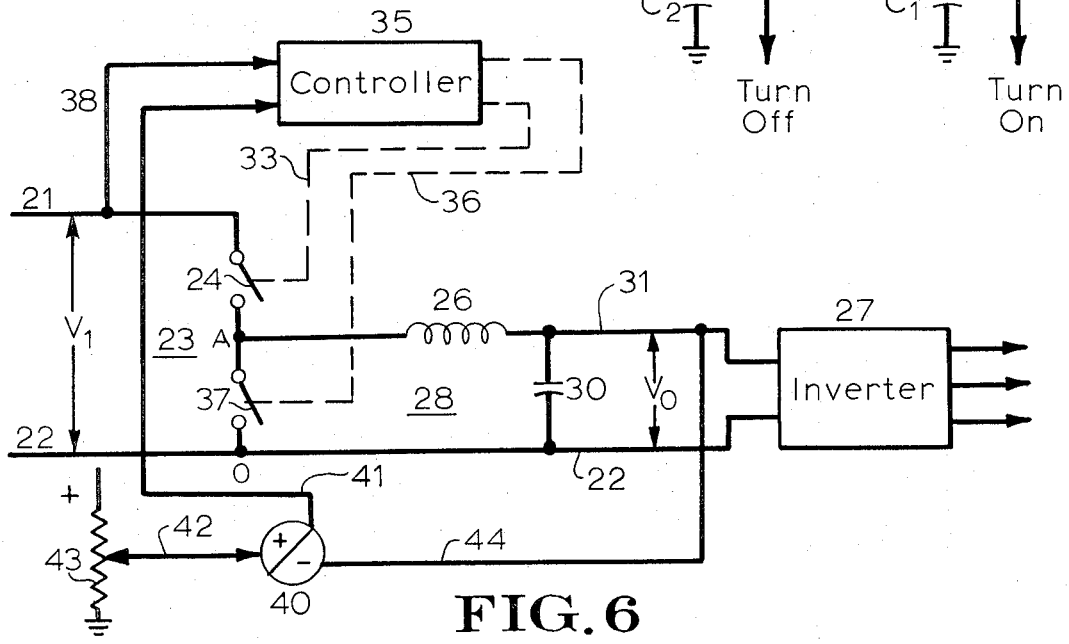
FIG. 6 is a system diagram illustrating the interconnection of the controller with a chopper to provide a system according to this invention.

FIG. 6 depicts a preferred embodiment of the invention which satisfies the two basic criteria set out in equations 9 and 13. Controller 35 provides output signals over line 33 to a first switch 24 in chopper 23, and also provides output signals over another line 36 to a second switch 37 in the chopper. Although represented as mechanical switches, the devices 24, 37 are generally silicon controlled rectifiers, power transistors, or other controllable units for regulating the transfer of d-c energy from the input circuit 21, 22 to the output circuit 31, 22.

In accordance with a first important aspect of the invention, conductor 38 is coupled between input conductor 21 and a first input connection of controller 35.

Conductor 38 is a means for applying to the controller a first input signal which is a function of the chopper circuit input voltage. This connection over conductor 38 meets the requirement of equation 13 by providing a current $I_o$ to the controller 35, which current is a function of the input bus voltage $V_i$.

In accordance with another important aspect of the invention, a comparator circuit 40 is provided as shown. This comparator includes an output connection coupled over conductor 41 to another input connection of controller 35. Comparator circuit 40 has a first input connection which is coupled, over conductor 42, to receive a reference voltage established by the setting of the movable arm of potentiometer 43. Comparator 40 has a second input connection which is coupled, over conductor 44, to the output circuit at conductor 31. With this arrangement the comparator 40 provides an error signal on line 41 which is a function of the algebraic sum of the reference signal on line 42 and the output voltage signal on line 44. By providing this error signal, which is a function of the output voltage $V_o$ supplied by the chopper-filter combination, the criterion set out in equation 9 is satisfied. Accordingly the system shown in FIG. 6 is effective to maintain a virtually constant output voltage $V_o$ without saturating the choke, even though there may be transient fluctuations of the input voltage $V_i$ supplied to the chopper circuit.

Figure 7:
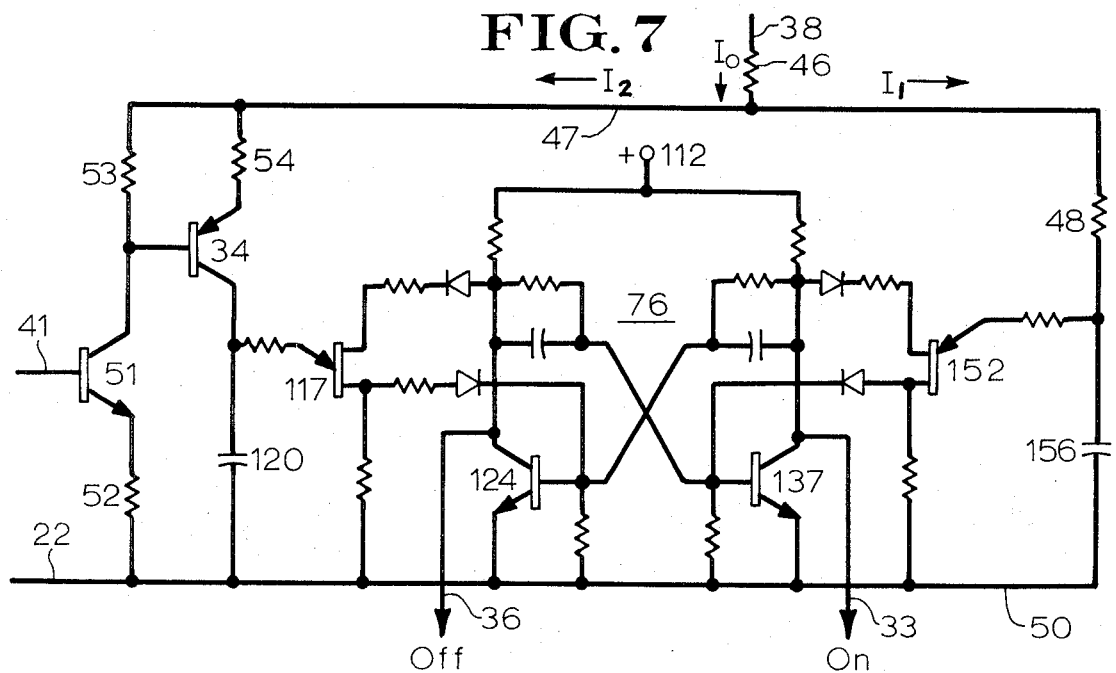
FIG. 7 is a schematic diagram of one circuit arrangement useful as the controller in FIG. 6.

FIG. 7 depicts one circuit suitable for use as controller 35 in FIG. 6. In general the timing capacitor 120, 156 correspond to the timing capacitors $C_2$, $C_1$ in FIG. 5. The other circuit components in the center of FIG. 7 including transistors 124, 137 in multivibrator 76, and the unijunction transistors 117, 152, correspond to the similarly numbered components in FIG. 15 of the above-identified U.S. Pat. No. 3,559,028 and 3,559,029. Any other suitable timing circuit can be substituted for these components, provided that the on-time signal delivered over line 33 remains a function of the charging of capacitor 156, and the off-time signal delivered over line 36 remains a function of the charging of capacitor 120.

In accordance with the present invention, a first input signal to controller 35 is applied from bus conductor 21 over conductor 38 and resistor 46 to common conductor 47. This has the effect of providing the total current $I_o$ which is split into the currents $I_2$ and $I_1$. Current $I_1$ flows through resistor 48 and charges capacitor 156 as it flows to common conductor 50, to trigger unijunction transistor 152, gate on transistor 137 in flip-flop 76, and provide the turn-on signal on line 33.

In accordance with another important aspect of the invention, the error signal on line 41 is applied to the base of an NPN type transistor 51, the emitter of which is coupled through a resistor 52 to common conductor 50 (which in its turn is coupled to common conductor 22 to provide a system reference). The collector of transistor 51 is coupled through another resistor 53 to conductor 47. Transistor 34 has its emitter coupled through a resistor 54 to conductor 47, its collector coupled to capacitor 120, and its base coupled to the common connection between resistor 53 and the collector of transistor 51. Thus the charging current $I_2$ (for timing capacitor 120) is controlled by a signal proportional to the chopper-filter output voltage $V_o$ over conductor 41 to the base of transistor 51. Accordingly with the controller circuit of FIG. 7 the basic conditions laid out in equations 9 and 13 are satisfied, and effective operation of the entire system is obtained. This effective operation may be better understood in connection with FIG. 8.

As there shown, assuming that at time $t_3$ the input voltage $V_i$ applied to the chopper has temporarily increased by about 50 percent, as compared to the input voltage at time $t_1$ and $t_2$, the circuit shown generally in FIG. 6 using a controller of the type set out in FIG. 7 operates to provide the off signal over line 36 more rapidly, shortening the on time ($\Delta t_{on}$) during which switch 24 is closed, but maintaining the same volt-time integral. The off-time ($\Delta t_{off}$) remains unchanged.

The foregoing explanation in connection with the arrangement of FIGS. 6 and 7 describes a system with feedback (from line 31 over line 44 to comparator 40) which regulates the controller operation. It is also possible to provide a controller which is substantially improved compared to prior art arrangements without using a feedback arrangement. That is, a feed-forward arrangement such as that shown in FIG. 9 can be utilized where a reference voltage level is established by the setting of the potentiometer 43, and this reference signal is passed over conductor 41 to one input connection of the comparator shown in FIG. 7. The connection over conductor 38 and resistor 46, to provide the controller with another input signal related to the chopper circuit input voltage, remains unchanged. Thus the comparator circuit 40 and the feedback connection over conductor 44 can be eliminated when it is not necessary to regulate the controller operation as a function of the actual output voltage $V_o$. In other words, the circuit of FIG. 9 does not compensate for fluctuations in the output voltage $V_o$ caused by load variations, whatever they may be.

Figure 9:
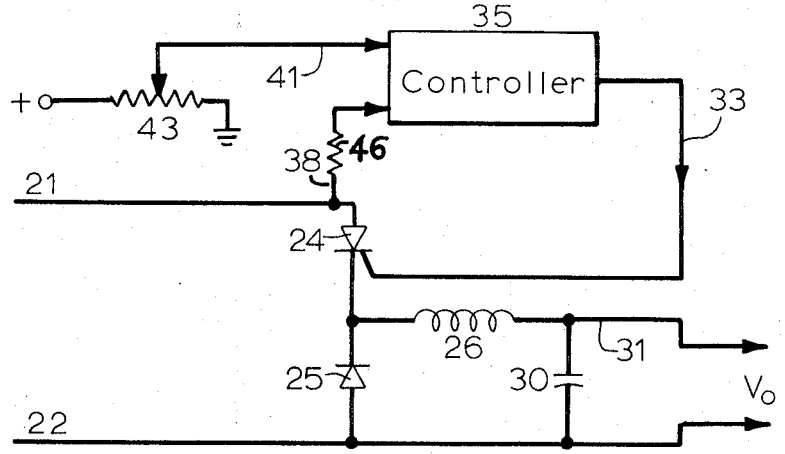
FIG. 9 is a general illustration of another system embodiment of the present invention.

In the embodiments of FIGS. 6, 7 and 9, with a d-c bus voltage $V_i$ of 600 volts, resistor 46 was made large (60 K ohms) to provide a practical level of $I_o$. The remainder of the circuit in FIG. 7, and suitable equivalents of the timing portions, will be understood by those skilled in the art, especially in the light of the explicit teaching in U.S. Pat. No. 3,559,028 and 3,559,029.

Figure 8:
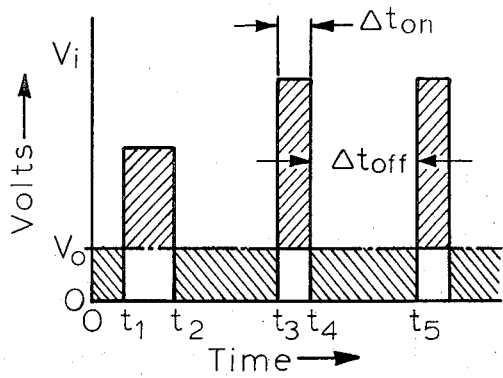
FIGS. 8 and 10 are graphical illustrations useful in understanding the system operation of FIG. 6.
Figure 10:
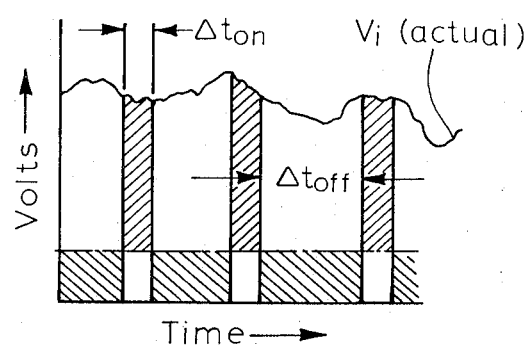

The foregoing explanation given in connection with FIGS. 2 and 8 were generally based on a simplified explanation relating to steady-state conditions, wherein the amplitude of the input voltage $V_i$ remains unchanged during the time under consideration. For a better understanding of the invention, it is helpful to consider the integrals of the shaded areas depicted in FIG. 10. Considering the operation of the controller 35, the amount of charge Q is given by $$Q = \int_0^t i\,dt + C$$

Assuming that the constant C is equal to zero, then the firing voltage $V_f$ is given by $$V_f = \frac{1}{C}\int_0^t i\,dt$$

To regulate the off time of the chopper, the current $I_{off}$ to charge capacitor. $C_2$ in FIG. 5 is made proportional to some constant K' and to the output voltage $V_o$. Then the firing voltage for the turn-off circuit can be expressed as $$V_{f_{\text{off}}} = \frac{K'}{C} \int_{\Delta t_{\text{off}}} V_o dt$$

The total input current $I_o$ received by the controller over resistor 46 is proportional to the chopper input voltage $V_i$ and to the constant $K'$. From inspection of the circuit in FIG. 5, it is apparent that the current $I_{on}$ for determining the turn-on signal is proportional to the toal current $I_o$ minus the other current $I_{off}$. From the foregoing, it is thus apparent that $I_{on}$ is proportional to $(V_i-V_o)$. Then the turn-on firing voltage can be expressed as $$V_{f_{\text{on}}} = \frac{K'}{C} \int_{\Delta t_{\text{on}}} (V_i - V_o) dt$$

By making the turn-on and turn-off firing voltages $V_{fon}$ and $V_{foff}$ equal to the same constant K, then on a percycle basis $$\int_{\Delta t_{\text{off}}} V_o dt = \int_{\Delta t_{\text{on}}} (V_i - V_o) dt = K$$

Now the negative volt-time integral on the choke 26 in the filter is given by $$\int_{\Delta t_{\text{off}}} V_o dt,$$

and the positive volt-time integral on the choke is given by $$\int_{\Delta t_{\text{on}}} (V_i - V_o) dt.$$

Now by selecting the value of K properly the positive and negative volt-time integrals are held to a fixed number and hence saturation of the choke is prevented. Moreover, since the positive and the negative volt-time integrals are equal on a per-cycle basis, the net voltage across inductor 26 on a per-cycle basis is zero. Thus the output voltage $V_o$ is not affected by any variation of the input voltage $V_i$. This may be seen, referring to FIG. 6, by noting that instantaneously $V_{ao} = V_{ind} + V_o$. By taking the average values over one cycle, then $\overline{V_{ao}} = \overline{V_{ind}} + \overline{V_o}$. The action of the controller 35 described above forces the voltage across the inductor $V_{IND}$ to be zero. Therefore $$\overline{V_{ao}} = \overline{V_o}$$

This means the average output voltage $V_o$ has no tendency to change due to variation of the input voltage $V_i$.

Considering the simplified arrangement of FIG. 5, it is apparent that the total current $I_o$ was made proportional to the input voltage $V_i$, and that the turn-off current $I_{off}$ was made proportional to the output voltage $V_o$. Given these two determinations of the currents $I_o$ and $I_{off}$, it is apparent that the third current $I_{on}$ is proportional to the difference between the input voltage $V_i$ and the output voltage $V_o$. It is thus possible to provide signals for determining any two of the three currents $I_o$, $I_{on}$ and $I_{off}$, and the third current will be determined in its turn according to the third of three expressions:

$$I_o \propto V_i$$
$$I_{off} \propto V_o$$
$$I_{on} \propto (V_i - V_o)$$

In the appended claims the term "connected" means a d-c connection between two components with virtually zero d-c resistance between those components. The term "coupled" indicates there is a functional relationship between two components, with the possible interposition of other elements between the two components described as "coupled" or "intercoupled."

While only particular embodiments of the invention have been described and claimed herein, it is apparent that various modifications and alterations of the invention may be made. It is therefore the intention in the appended claims to cover all such modifications and alterations as may fall within the true spirit and scope of the invention.

What is claimed is:

1. A dc-to-dc conversion system, including a chopper circuit having at least one semiconductor switch, an input circuit for applying an input voltage subject to transient fluctuations to the chopper circuit, an output circuit for passing an output voltage to a load, and a filter including an inductor coupled in series between the chopper circuit and the output circuit, a controller connected to apply control signals to the chopper circuit to regulate the conduction times of the semi-conductor switch, means for applying to the controller a first input signal which is a function of the chopper circuit input voltage, and means for applying to the controller a second input signal which is a function of a reference voltage, thus preventing saturation of the filter inductor and maintaining the chopper output voltage substantially constant, notwithstanding the transient fluctuations of the input voltage supplied to the chopper circuit.

2. A dc-to-dc conversion circuit as claimed in claim 1, and further comprising a comparator circuit having an output connection coupled to the controller, a first input connection connected to receive the reference voltage, and a second input connection coupled to the output circuit, which comparator provides an error signal which is a function of the algebraic sum of the reference voltage and the output voltage.

3. A dc-to-dc conversion system, including a chopper circuit having at least one semiconductor switch, an input circuit for applying an input voltage subject to transient fluctuations to the chopper circuit, an output circuit for passing an output voltage to a load, a filter including an inductor coupled in series between the chopper circuit and the output circuit, a controller connected to apply control signals to the chopper circuit to regulate the conduction times of the semiconductor switch, means for applying to the controller a first input signal which is a function of the chopper circuit input voltage, a comparator circuit having a first input connection connected to receive a reference voltage, a second input connection coupled to the output circuit, an output connection for providing an error signal which is a function of the algebraic sum of the reference voltage and the output voltage, and means for applying the error signal as a second input signal to the controller, thus preventing saturation of the filter inductor and maintaining the chopper output voltage substantially constant, notwithstanding the transient fluctuations of the input voltage supplied to the chopper circuit.

4. The method of converting an input d-c voltage $V_i$ to an output voltage $V_o$ for energizing a load from the output voltage, including the steps of regulating the on and off times of a switch to correspondingly regulate that portion of the input voltage $V_i$ which appears as the output voltage $V_o$, and filtering the voltage passed from the switch to become the output voltage through a circuit including a series-connected inductor, which method is characterized by the steps of:

sensing the input voltage $V_i$, providing a reference voltage, and controlling the on and off times of the switch as a function of both the input voltage $V_i$ and the reference voltage, to effect switching operation such that the volt-time integral when the switch is closed is kept substantially equal to a constant and the volt-time integral when the switch is opened is kept substantially equal to the same constant.

5. The method of converting an input d-c voltage $V_i$ to an output voltage $V_o$ for energizing a load from the output voltage, including the steps of regulating the on and off times of a switch to correspondingly regulate that portion of the input voltage $V_i$ which appears as the output voltage $V_o$, and filtering the voltage passed from the switch to become the output voltage through a circuit including a series-connected inductor, which method is characterized by the steps of:

sensing the input voltage $V_i$, sensing the output voltage $V_o$, providing a reference voltage, comparing the output voltage $V_o$ with the reference voltage to provide an error signal connoting the relationship of the output voltage to the reference voltage, and controlling the on and off times of the switch as a function of both the input voltage $V_i$ and the error signal, to effect switching operation such that the volt-time integral when the switch is closed is kept substantially equal to a constant and the volt-time integral when the switch is opened is kept substantially euqal to the same constant.

6. A dc-to-dc conversion system, including a chopper circuit having at least one semiconductor switch capable of being switched on and off, an input circuit for applying an input voltage $V_i$ subject to transient fluctuations of the chopper circuit, an output circuit for passing an output voltage $V_o$ toward a load, a filter including an inductor coupled in series between the chopper circuit and the output circuit, and controller connected to apply first and second control signals to the chopper circuit to regulate the on and off times of the semiconductor switch, which controller includes a flip-flop circuit operative in its first state to provide said first control signal for turning said semiconductor switch on and operative in its second state to provide said second control signal for turning said semiconductor switch off, a first charging circuit including a first capacitor connected to regulate the switching of the flip-flop circuit to its first state, a second charging circuit including a second capacitor connected to regulate the switching of said flip-flop circuit to its second state, means including a common conductor for passing a portion of a charging current signal to said first charging circuit and for passing the remainder of said charging current signal toward said second charging circuit, means, coupled between said input circuit and said common conductor, for supplying to the controller said charging current signal which varies as a function of the input voltage $V_i$, circuit means connected in said second charging circuit for modifying said remainder of the charging current signal passed toward the second capacitor, and means for applying a reference signal to said circuit means, to modify the turn-off signal to the semiconductor switch as a function both of the input voltage $V_i$ and of said reference signal.

7. A dc-to-dc conversion system, including a chopper circuit having at least one semiconductor switch capable of being switched on and off, an input circuit for applying an input voltage $V_i$ subject to transient fluctuations to the chopper circuit, an output circuit for passing an output voltage $V_o$ toward a load, a filter including an inductor coupled in series between the chopper circuit and the output circuit, and a controller connected to apply first and second control signals to the chopper circuit to regulate the on and off times of the semiconductor switch, which controller includes a flip-flop circuit operative in its first state to provide said first control signal for turning said semiconductor switch on and operative in its second state to provide said second control signal for turning said semiconductor switch off, a first charging circuit including a first capacitor connected to regulate the switching of the flip-flop circuit to its first state, a second charging circuit including a second capacitor connected to regulate the switching of said flip-flop circuit to its second state, means including a common conductor for passing a portion of a charging current signal to said first charging circuit and for passing the remainder of said charging current signal toward said second charging circuit, means, coupled between said input circuit and said common conductor, for supplying to the controller said charging current signal which varies as a function of the input voltage $V_i$, circuit means connected in said second charging circuit for modifying said remainder of the charging signal passed toward the second capacitor, means for providing a reference signal, means coupled to said output circuit for providing a feedback signal which varies as the output voltage $V_o$, a comparator connected to receive both said reference signal and said feedback signal and to provide an output error signal, and means for applying said output error signal to said circuit means, thus to modify the turn-off signal to the semiconductor switch as a function both of the input voltage $V_i$ and of said output error signal.

8. A dc-to-dc conversion system, including a chopper circuit having at least one semiconductor switch which is turned on as a function of a turn-on signal developed by a current $I_{on}$ and which is turned off by a turn-off signal developed by a current $I_{off}$, an input circuit for applying an input voltage $V_i$ subject to transient fluctuations to the chopper circuit, an output circuit for passing an output voltage $V_o$ a load, a filter including an inductor coupled in series between the chopper circuit and the output circuit, a controller connected to apply control signals to the chopper circuit to regulate the turn-on and turn-off signals supplied to the semiconductor switch in accordance with the current signals $I_{on}$ and $I_{off}$, means for applying to the controller a first input signal $I_o$ which is a function of the chopper circuit input voltage $V_i$ and which is divided to supply the $I_{on}$ and $I_{off}$ current signals, and means for supplying to the controller a second input signal which is a function of the chopper circuit output voltage $V_o$, characterized in that said controller is connected to regulate the signals $I_{on}$ and $I_{off}$ in accordance with any two of the following three criteria:

$$I_o \alpha V_i$$
$$I_{off} \alpha V_o$$
$$I_{on} \alpha (V_i - V_o)$$

9. A dc-to-dc conversion system, including a chopper circuit having at least one semiconductor switch, an input circuit for applying an input voltage subject to transient fluctuations to the chopper circuit, an output circuit for passing an output voltage to a load, and a filter including an inductor coupled in series between the chopper circuit and the output circuit, a controller connected to apply control signals to the chopper circuit to regulate the conduction times of the semiconductor switch, means for applying to the controller a first input signal which is a function of the chopper circuit input voltage, means for applying to the controller a second input signal which is a function of a reference voltage, and circuit means in said controller, connected to shorten the on time ($\Delta t_{on}$) during which the one semiconductor switch is closed responsive to an increase in the chopper circuit input voltage, thus maintaining constant the volt-time integral when the semiconductor switch is closed, which circuit means is also connected to maintain the off time ($\Delta t_{off}$) unchanged so that the volt-time integral when the semiconductor switch is opened is maintained constant and substantially equal to the volt-time integral when the semiconductor switch is closed.

10. A dc-to-dc conversion system, including a chopper circuit having at least one semiconductor switch, an input circuit for applying an input voltage subject to transient fluctuations to the chopper circuit, an output circuit for passing an output voltage to a load, a filter including an inductor coupled in series between the chopper circuit and the output circuit, a controller connected to apply control signals to the chopper circuit to regulate the conduction times of the semiconductor switch, means for applying to the controller a first input signal which is a function of the chopper circuit input voltage, a comparator circuit having a first input connection connected to receive a reference voltage, a second input connection coupled to the output circuit, an output connection for providing an error signal which is a function of the algebraic sum of the reference voltage and the output voltage, and means for applying the error signal as a second input signal to the controller, and circuit means in said controller, connected to shorten the on time ($\Delta t_{on}$) during which the one semiconductor switch is closed responsive to an increase in the chopper circuit input voltage, thus maintaining constant the volt-time integral when the semiconductor switch is closed, which circuit means is also connected to maintain the off time ($\Delta t_{off}$) unchanged so that the volt-time integral when the semiconductor switch is opened is maintained constant and substantially equal to the volt-time integral when the semiconductor switch is closed.

* * * * *

UNITED STATES PATENT OFFICE
CERTIFICATE OF CORRECTION

Patent No. 3,815,008     Dated June 4, 1974

Inventor(s) George H. Studtmann et al.

It is certified that error appears in the above-identified patent and that said Letters Patent are hereby corrected as shown below:

Column 11, Claim 6, line 8, before "controller" insert -- a --. Column 12, Claim 8, line 8, after "$V_o$" insert -- to --.

Signed and sealed this 1st day of October 1974.

(SEAL)
Attest:

McCOY M. GIBSON JR.
Attesting Officer

C. MARSHALL DANN
Commissioner of Patents